United States Patent
Danner

(10) Patent No.: US 8,653,229 B2
(45) Date of Patent: Feb. 18, 2014

(54) POLYMERISATION OF HEXAFLUOROPROPYLENE OXIDE

(75) Inventor: Bernard Danner, Riedisheim (FR)

(73) Assignee: Clariant Finance (BVI) Limited, Virgin Islands (VG)

( * ) Notice: Subject to any disclaimer, the term of this patent is extended or adjusted under 35 U.S.C. 154(b) by 188 days.

(21) Appl. No.: 12/934,379

(22) PCT Filed: Mar. 25, 2009

(86) PCT No.: PCT/EP2009/053532
§ 371 (c)(1),
(2), (4) Date: Dec. 16, 2010

(87) PCT Pub. No.: WO2009/118348
PCT Pub. Date: Oct. 1, 2009

(65) Prior Publication Data
US 2011/0092665 A1    Apr. 21, 2011

(30) Foreign Application Priority Data

Mar. 28, 2008 (EP) ..................................... 08290293
May 28, 2008 (EP) ..................................... 08290489

(51) Int. Cl.
| C08G 65/22 | (2006.01) |
| C08G 65/34 | (2006.01) |
| C08G 65/00 | (2006.01) |
| C08F 6/08 | (2006.01) |

(52) U.S. Cl.
USPC ........... 528/402; 528/403; 528/425; 528/488; 528/494; 528/502 R; 528/503

(58) Field of Classification Search
USPC ...... 528/402, 425, 488, 494, 502 R, 503, 403
See application file for complete search history.

(56) References Cited

U.S. PATENT DOCUMENTS

| 3,322,826 A | 5/1967 | Moore |
| 5,399,754 A | 3/1995 | Oyama et al. |
| 6,127,517 A | 10/2000 | Koike et al. |
| 2004/0116742 A1 | 6/2004 | Guerra |

FOREIGN PATENT DOCUMENTS

| EP | 0151877 | * | 8/1985 |
| EP | 1698650 | * | 9/2006 |
| GB | 1341975 | | 12/1973 |
| JP | 63191825 | | 8/1988 |
| WO | WO 2004/060849 | * | 7/2004 |
| WO | WO 2006/093885 | | 9/2006 |

OTHER PUBLICATIONS

PCT International Search Report for PCT/EP 2009/053532, Mar. 31, 2010.
Paleta O et at.: "Radical Additions to Fluro-olefins Photochemical mono-fluoroalkylation and sequential bis fluroalkylation of oxolane", Journal of Fluorine Chemistry, Elsevier, NL vol. 80, pp. 125-134, XP004071320, Jan. 1, 1996.
E. Meissner, E.A.: "Oligomerization of hexafluoropropylene oxide in the presence of alkali metal halides", Polish Journal of Chemical Technology, vol. 9, No. 3, pp. 95-97, XP 008111811, 2007.
Hill J. T.: "Polymers from hexafluoropropylene oxide", Journal of Macromolecular Science A. Pure & Applied Chemistry, Marcel Dekker, US, vol. 8, No. 3, pp. 499-500 XP 008092019, Jan. 1, 1974.
English Abstract for JP 63191825, published Aug. 9, 1988.

* cited by examiner

Primary Examiner — Duc Truong
(74) Attorney, Agent, or Firm — Miles & Stockbridge, P.C.

(57) ABSTRACT

Process for the oligomerization of hexafluoropropylene oxide (HFPO) in which the sum of the dimers, trimers, tetramers, pentamers and hexamers represents less than 20% of the weight of the polymerized HFPO, the oligomers other than the dimers, trimers, tetramers, pentamers and hexamers (the remaining oligomers) having an average molecular weight ranging between 1100 and 4000 g/mol, characterized in that the process comprises the steps of contacting hexafluoropropylene oxide (HFPO) at a temperature between −30° C. to +50° C. with a catalyst system selected from potassium fluoride and di-, tri- or tetraethyleneglycol-dimethylether in the presence of a solvent which is selected from perfluorinated aliphatic or aromatic hydrocarbon with more than 3 and less than 12 C-atoms and optionally a polar group but not comprising chlorine or bromine partially fluorinated aliphatic or aromatic hydrocarbon with more than 3 and less than 12 C-atoms and optionally a polar group but not comprising chlorine or bromine at a pressure of less than 3 bars by controlled monomer addition continuous feeding or by adding the monomer in one or two portions (shots).

8 Claims, No Drawings

POLYMERISATION OF HEXAFLUOROPROPYLENE OXIDE

The present invention relates to the anionic polymerization of hexafluoropropylene oxide (HFPO). In particular, the present invention relates to a polymerization of HFPO that yields a desired degree of polymerization combined with a low amount of low molecular weight oligomers of HFPO. Low molecular weight oligomers are those oligomers having a degree of polymerization of 4 or less.

The polymerization of HFPO is well known in the art and has been described in a variety of publications or patents.

U.S. Pat. No. 6,127,517 describes the polymerization of HFPO in the presence of hexafluoropropylene (HFP) using CsF as a catalyst.

WO2006093885 relates to a process for polymerizing a mixture of HFPO and HFP in the presence of an aprotic organic solvent using KF as a catalyst. Disadvantage of all these processes is the use of HFP which is difficult to recycle due to the low boiling point (−28° C.).

PALETA ET AL: "Radical additions to fluoro-olefins—photochemical mono-fluoroalkylation and sequential bis-fluoroalkylation of Oxolane", JOURNAL OF FLUORINE CHEMISTRY, vol. 80, 1996, pages 125-134 relates to the polymerization of HFPO with KF and diglyme (diethyleneglycol dimethyl ether) in the presence of hexafluoropropene (HFP) and ethyl fluoro oxalate resulting in oligomers ranging from the dimer to the heptamer.

US 2004/0116742 relates to a reaction wherein HFPO is condensed with a low molecular acid fluorid and almost 100% of the product is the 1:1 and the 1:2 addition product.

U.S. Pat. No. 3,322,826 relates to HFPO polymerization process which leads to ogliomers from n=1 to 6.

EP 151877 relates to a process of photo polymerization of HFPO.

The disadvantage of the processes using CsF is the very strong exothermic start of the reaction and the potentially undesired contamination of the product by Cs-ions. Cs is expensive and toxic. Additionally low molecular weight oligomers are more volatile and are less suitable for high temperature application.

In order to overcome the above mentioned limitations and disadvantages the present invention provides a process for the oligomerization of hexafluoropropylene oxiyde (HFPO) to get oligomers in which the sum of the dimers, trimers, tetramers, pentamers and hexamers represents less than 20%, preferably less than 15%, most preferred less than 10% of the weight of the fully consumed HFPO, the remaining oligomers having an average molecular weight between 1100 and 4000 g/mol, which comprises contacting HFPO at a temperature between −30° C. to +50° C. with a catalytic system is foamed from potassium fluoride (KF) with a glycol ether in the presence of a perfluorinated or partially fluorinated, non chlorinated, saturated, aliphatic or aromatic hydrocarbon with more than 3 and less than 12 carbon atoms and optionally a polar group at a pressure of less than 3 bars by controlled monomer addition or by adding the monomer in one or two portions (shots)

The present invention provides a process for the oligomerization of hexafluoropropylene oxide (HFPO) in which the sum of the dimers, trimers, tetramers, pentamers and hexamers represents less than 20%, preferably less than 15%, most preferred less than 10% of the weight of the polymerized HFPO, the oligomer other than the dimers, trimers, tetramers, pentamers and hexamers (the remaining oligomers) having an average molecular weight between 1100 and 4000 g/mol, characterized in that the process comprises the steps of contacting hexafluoropropylene oxide (HFPO) at a temperature between −30° C. to +50° C. with a catalytic system is formed from potassium fluoride (KF) with a glycol ether in the presence of a solvent which is selected from perfluorinated saturated aliphatic or aromatic hydrocarbon with more than 3 and less than 12 C-atoms and optionally the solvent comprises a polar group but the solvent does not comprise chlorine or the solvent is selected from partially fluorinated saturated aliphatic or partially fluorinated aromatic hydrocarbon with more than 3 and less than 12 C-atoms and optionally the partially fluorinated solvent comprises a polar group but the partially fluorinated solvent does not comprising chlorine at a pressure of less than 3 bars by controlled monomer addition (continuous feeding) or by adding the monomer in one or two portions (shots).

The process of the present invention is carried out in the absence of hexafluoropropylene (HFP).

The catalytic system is formed from potassium fluoride (KF) with a glycol ether, wherein preferably the glycol ethers are selected from diethyleneglycol-dimethylether, triethyleneglycol-dimethylether, tetraethyleneglycol-dimethylether and pentaethyleneglycol-dimethylether.

The low molecular weight volatile oligomers are distilled out of the resulting mixture of oligomers after the polymerization. Alternatively, the low molecular weight volatile oligomers are distilled out of the resulting mixture of oligomers after transforming the formed oligomers into the corresponding ester.

Preferably, the solvent is not fully perfluorinated. Preferably, the oligomerization is carried out in the presence of a solvent containing an aromatic group, anether or an ester group.

Preferably, the oligomerization is carried out at temperatures between −20° C. and +20° C.

Preferably, the oligomerization is carried out by controlled monomer addition at a pressure of less than 2 bars, more preferably less than 1.8 bar.

The oligomerization can be carried out in the presence of an additional polar, non fluorinated solvent. The glymes (di-, tri-, tetra- or penta-ethyleneglycol-dimethylether) are a part of the catalytic system.

The ratio of HFPO to KF (by weight) varies from 20 to 140 and ranges preferably in the continuous process from 20 to 60, more preferably from 30 to 50.

Preferably the oligomerization is carried out by controlled monomer addition. The expression "Controlled Monomer Addition" means that the addition is steady with a relatively constant flow of HFPO (continuous feeding) and the temperature and the pressure are also kept as constant as possible (constant pressure means plus-minus 10° C., preferably plus-minus 5° C., more preferably plus-minus 2° C.; the pressure shall not raise over 3 preferably not over 2 more preferably not over 1.8 bar and the pressure in the reaction vessel shall not change more than 30% preferably not more than 20%) by adjusting the temperature of the cooling jacket, respectively by cooling the reaction vessel. However, the preferred method of regulation of the temperature and the pressure is the regulation of the addition rate of the HFPO. If the pressure or the temperature is rising over the set limits, the addition rate of HFPO is reduced (but preferably the addition of HFPO is not totally stopped), and if the temperature or the pressure is falling below the set limit, the addition rate of the HFPO is increased.

The preferred monomer addition method is the controlled monomer addition thus the monomer is continuously fed into the vessel.

When starting with the addition of the HFPO, the vessel is kept under vacuum, and during the addition of the HFPO the pressure and the temperature is raising to the level on which the reaction is carried out and kept at this level. At the end of the HFPO addition the oligomerisation of the remaining HFPO in the reactor makes that the pressure is sinking and at the end a vacuum is built up. The lower the HFPO concentration in the reactor is remaining the lower is the pressure in the reactor.

Preferably the oligomerization is carried out with a weight ratio of the di-, tri- or tetraethyleneglycol-dimethylether (glyme) to potassium fluoride ranging between 1.0 and 10.0.

Preferably the oligomerization is carried out with a weight ratio of the perfluorinated solvent and the di-, tri- or tetraethyleneglycol-dimethylether ranging between 1 and 25.

Possible solvents for the process of the present invention are $CF_3CH_2OCH_2CF_3$; $HCF_2CF_2CH_2OCH_3$; $CHF_2CF_2OCH_2CF_2CHF_2$; $F_2C_6H_3OCH_3$; $C_6H_5OCF_3$; $CF_3OC_6H_4F$; $CF_3COOCH_2CF_3$; $CF_3CO_2CH_2CH_2OCOCF_3$; $CF_3CH_2OC_2H_4OCH_2CF_3$; perfluorobutyltetrahydrofurane ($C_8F_{16}O_1$); $CH_3OCH_2CF_2CFH_2$; $CF_3CF_2CF_2CF_2OCH_3$; $CH_3OCH_2CF_2CF_2CF_2F_2H$; $CH_3OCH_2CF_2CFHCF_3$; $CF_3CH_2OCOCH_3$; $(CF_3)_2CHOCOCH_3$; $CF_3O-C_6H_4-OCF_3$; $CF_3OC_6H_4F$; $CF_3OC_6H_4OCH_3$; $C_2F_5CO_2C_2H_4OC_2H_4OCOC_2F_5$; $(CF_3)_2CHOC_2H_4OC_2H_4OCH(CF_3)_2$; $CH_3CO_2CH_2C_2F_4H$; $CH_3CO_2CH_2C_4F_8H$; $CH_3CO_2CH_2CF_2CFHCF_3$; $CHF_2CF_2CF_2CF_2COOCH_3$; $CF_3CF_2COOCH_3$; $CF_3CF_2CF_2COOCH_3$; $CF_3CF(OCH_3)COOCH_3$; $CH_3OOC(CF_2)_nCOOCH_3$ with n=2, 3, 4, 6, 8 $C_2H_5OCO(CF_2)_3COOC_2H_5$; $HCF_2COOC_2H_5$; $CF_3CF_2CF_2COOC_2H_5$; $CF_3CF_2COOC_2H_5$; $CF_3COOC_2H_5$; $CF_3(CF_2)_3COOC_2H_5$; $C_6H_5OCF_2CHFCF_3$; $C_6F_5COOCH_3$; $(CF_3)_2CFC_6H_4CH_3$; $C_2F_5C_3H_6OCH_3$; $C_2F_5C_3H_6OCOCH_3$; $(CF_3)_2CFC_3H_6OCH_3$; $(CF_3)_2CFC_3H_6OCF_3$; $(CF_3)_2CFC_3H_6OCOCH_3$; $C_4F_9C_3H_6OCH_3$; $C_4F_9C_3H_6OCF_3$; $(CF_3)_2CFCH_2CF_2C_3H_6OCH_3$; $(CF_3)_2CFCH_2CF_2C_3H_6OCOCH_3$; 1,4-bistrifluoromethylbenzene or 1,3-bistrifluoromethylbenzene; hexafluorobenzene; $(CF_3)_2CF(CH_2)_nCH_2OAc$ with n=1, 2, 3, 4.

Other possible fluorinated solvents without ether, ester or aromatic groups are Decafluorocyclohexane, Difluorobenzene, Trifluorobenzene, Perfluoro-n-pentane, Perfluorohexane, Perfluoromethylcyclohexane, Perfluoro-n-butane, Perfluoromethyldecalin, $H(CF_2)_4H$, $H(CF_2)_6H$, $CF_3CHFCHFCF_2CF_3$; Hexafluorocyclobutane.

Possible fluorinated solvent with nitrilogroups are 3,5-Bis(trifluoromethyl)benzonitrile, Difluorobenzonitrile or $CF_3CF_2CF_2CN$, $HCF_2CFHOCF_2CF(CF_3)CN$.

Preferred solvents are perfluorinated or fluorinated solvents. Preference is given to fluorinated resp. perfluorinated solvents with more than 3 and less than 12 Carbon atoms. The more preferred solvents are selected from the group of 1,3-bistrifluoromethylbenzene, perfluoro-2-n-butyl-tetrahydrofurane, 1,1,1,3,3,-pentafluorobutane, 1-(propoxy)heptafluoropropane, 1-(methoxy)nonafluorobutane, 1-(ethoxy)-nonafluorobutane, 3-ethoxy-1,1,1,2,3,4,4,5,5,6,6,6,-dodecafluoro-2-trifluoromethyl-hexane, bis(2,2,2-trifluoroethylether), 1-methoxy-1,1,2,3,3,3,-hexafluoropropane, 1,1,1,2,2,-pentafluorobutane, trifluoromethylbenzene, trifluoromethoxybenzene, ethyleneglycolditrifluoroacetate, ethyleneglycol-bis-2,2,2,-trifluoroethylether, 1-methoxy-2,2,3,-trifluoropropane, 1-methoxy-2,2,3,3,-trifluoropropane, 1-methoxy-2,2,3,4,4,4,-hexafluorobutane, 1-methoxy-2,2,3,3,4,4,5,5,-octafluoropentane. Bis-(trifluormethyl)-benzene, especially 1,3-bis-(trifluormethyl)-benzene, is the most preferred solvent.

Especially preferred solvents are nonafluorobutyl-methyl-ether, 1,3-bis-(trifluoromethyl)-benzene and 1,1,1,3,3-pentafluorobutane.

A single fluorinated solvent or mixtures of different fluorinated solvents can also be used.

Additional non fluorinated solvents like acetonitrile, 1,3-dicyano-propane, 1,4-dicyano-butane can be present as cosolvents. Preferably, there are no non fluorinated solvents present.

After polymerization, the obtained polymeric oligo (HFPO) ω-terminated (omega-terminated; see IUPAC-rule 3-AA-2.2.1) acid fluoride is generally converted into an ester by reaction with an alcohol, optionally in the presence of a base in order to neutralize the generated HF. Generally, methanol in excess is used together with a tertiary amine to convert the acid fluoride into the methyl ester. Low molecular weight oligomeric methylesters can then be separated from the higher oligomeric HFPO—methylesters and quantified (weight) by distillation (under vacuum). After distillation the equivalent weight of 1 $COOCH_3$ group of the distillation residue is determined by reacting the polymeric ester with an amine in excess and titration of the unreacted amine. This equivalent weight is close to the average molecular weight which can be determined by Gel Permeation Chromatography (GPC or SEC). GC can also be used to check the absence of peaks of low molecular weight species. The amount of distillation residue compared to the amount of introduced HFPO in combination with the GC analysis of the residue and the distillate gives the amount of low molecular weight oligomers formed during polymerization.

The resulting oligomers according to the present invention have a viscosity of 70 to 8000 mPas preferably 300 to 3000 mPas when measured with a Brookfield® rotation viscosimeter using the spindle number 3 at 23° C.

The invention will now be illustrated by the following examples in which all parts are by weight and all temperatures are in degrees Celsius unless otherwise indicated.

EXAMPLES

A) Controlled Monomer Addition (1 Step)

In a dry, stainless-steel pressure-vessel, equipped with a stirrer, thermometer, a heating and cooling jacket, a gas inlet tube for nitrogen or hexafluoropropyleneoxyde (HFPO), a connection to a vacuum line and the possibilty to connect a side arm fitted with a condenser and optionally a receiver, tetraethyleneglycoldimethylether (tetraglyme) and the catalyst are loaded under agitation and heated up to 100° C. under vacuum to remove traces of water. After cooling down to −15° C. the HFPO is released into the vacuum, optionally together with the perfluorinated or partially fluorinated solvent is added. Then the temperature is adjusted to the desired value chosen for the anionic ring-opening polymerisation and the addition of HFPO is started with a high speed of agitation to get a good distribution and small size of the gas bubbles in the liquid. The pressure in the vessel is adjusted to 1.2 to 1.8 bar by setting the speed of addition. The addition is steady and the temperature kept as constant as possible by adjusting the temperature of the cooling jacket.

After a certain period of time the HFPO addition is stopped and after vacuum (200 to 700 mbar) was obtained in the polymerization reactor the temperature is slowly increased to 20° C., the perfluorinated solvent is distillated under vacuum and the distillation residue is poured on dry methanol with agitation. After the separation of the polymer and methanol phases, the liquid viscous polymer phase is washed several times with methanol in order to remove the formed HF and traces of the catalyst (KF and tetraethyleneglycoldimethylether). The obtained polymeric HFPO methylester is then distillated in order to remove low molecular weight species. Distillation is run at 160° C. and approx. 1 mm Hg pressure (vacuum). The yield is the percentage of polymeric HFPO methylester (residue of the distillation) related to the quantity of introduced (consumed) monomeric HFPO.

The obtained oligomeric HFPO methyl ester may contain small amounts of KF which is filtered off. The product is a clear oil with a viscosity which depends on the polymerisation degree.

The following examples 1 to 4 were made according to the general method A) Controlled monomer addition (1 step) with the details as given in the examples 1 to 4:

Example 1

Catalyst: 18 g of KF and 44.9 g of tetraethyleneglycoldimethylether
Solvent: 230.0 g of nonafluorobutyl-methylether
Temperature: −11° C.
Time of HFPO addition: 12 h
Quantity of HFPO introduced: 726 g
PolyHFPO methylester (distillation residue): 660 g
Yield: 91%
Equivalent weight for 1 $COOCH_3$ group: 2060 g
The distilled residue was analyzed additionally by gas chromatography and the following results were obtained, were n signifies the oligomerisation degree:

| n | area | area-% |
|---|------|--------|
| 8 | 4212 | 1.00 |
| 9 | 16005 | 3.82 |
| 10 | 43371 | 10.34 |
| 11 | 72102 | 17.19 |
| 12 | 74136 | 17.67 |
| 13 | 56981 | 13.58 |
| 14 | 39467 | 9.41 |
| 15 | 28409 | 6.77 |
| 16 | 20355 | 4.85 |
| 17 | 15558 | 3.71 |
| 18 | 12086 | 2.88 |
| 19 | 9767 | 2.33 |
| 20 | 7719 | 1.84 |
| 21 | 6350 | 1.51 |
| 22 | 4964 | 1.18 |
| 23 | 3534 | 0.84 |
| 24 | 1890 | 0.45 |
| 25 | 1278 | 0.30 |
| 26 | 691 | 0.16 |
| 27 | 643 | 0.15 |

Example 2

Catalyst: 6 g of KF and 14.7 g of tetraethyleneglycoldimethylether
Solvent: 34.5 g of 1,3-bis-(trifluoromethyl)-benzene
Temperature: −11° C.
Time of HFPO addition: 7 h
Quantity of HFPO introduced: 192 g
PolyHFPO methylester (distillation residue): 167 g
Yield: 87%
Equivalent weight for 1 COOCH3: 2000 g

Example 3

Catalyst: 6 g of KF and 7.1 g of tetraethyleneglycoldimethylether
Solvent: 63.5 g of 1,1,1,3,3-pentafluorobutane
Temperature: −11° C.
Time of HFPO addition: 7 h
Quantity of HFPO introduced: 197 g
PolyHFPO methylester (distillation residue): 182 g
Yield: 92%
Equivalent weight for 1 $COOCH_3$: 1800 g

Example 4

Catalyst: 18 g of KF and 43.9 g of tetraethyleneglycoldimethylether
Solvent: 208.4 g of 1,3-bis-(trifluoromethyl)-benzene
Temperature: −16° C.
Time of HFPO addition: 8 hours
Quantity of HFPO introduced: 731.0 g
Yield: 93%
Equivalent weight for 1 $COOCH_3$ group: 2446 g.
The distilled residue was analyzed additionally by gas chromatography and the following results were obtained, were n signifies the oligomerisation degree:

| n | area | area-% |
|---|------|--------|
| 7 | 1464 | 0.10 |
| 8 | 4754 | 0.34 |
| 9 | 6053 | 0.43 |
| 10 | 7989 | 0.56 |
| 11 | 11708 | 0.83 |
| 12 | 17829 | 1.26 |
| 13 | 29616 | 2.09 |
| 14 | 54945 | 3.88 |
| 15 | 95295 | 6.73 |
| 16 | 137141 | 9.68 |
| 17 | 162985 | 11.50 |
| 18 | 171625 | 12.11 |
| 19 | 174073 | 12.28 |
| 20 | 162483 | 11.47 |
| 21 | 135068 | 9.53 |
| 22 | 99611 | 7.03 |
| 23 | 66404 | 4.69 |
| 24 | 40202 | 2.84 |
| 25 | 21941 | 1.55 |
| 26 | 10218 | 0.72 |
| 27 | 4056 | 0.29 |
| 28 | 1548 | 0.11 |

B) Controlled Monomer Addition (2 Steps)

Example 5

A pressure vessel is charged with 1.75 g KF followed by the addition of 10.0 g tetraglyme and 11.8 g acetonitrile. Then the reactor is fluxed with nitrogen and cooled to −10° C. During a first step approx. 25 g of HFPO are introduced into the pressure vessel and stirred during some hours in order to be converted to soluble initiator compound. Then the second step is started with the addition of 206.7 g 1,3-bis(trifluormethyl)-benzene and the addition at −10° C. during 2 h at a pressure of 0.7 bar of 210.0 g of HFPO. After reaction with methanol and distillation at 160° C., under 1 mm Hg, 205 g polymer with an ester equivalent of 2400 g is obtained. The yield is approx. 87%. A clear oil was obtained.

C) Introduction of HFPO in One Shot (Uncontrolled Addition)

In a dry (heat treated), with nitrogen inertized pressure vessel KF is charged, heated to 70° C. under vacuum and then combined with tetraglyme and (per)fluorinated solvent through a vacuum transfer system. Then the reactor is cooled to −35° C., and slowly filled with a certain quantity of HFPO. After closing the reactor temperature is increased to 0° C. under stirring and when 0° C. is reached, stirring is continued for 15 hours. Then the polymeric acid fluoride is converted into oligo(HFPO) methylester by the addition of methanol. After washing with methanol, the polymer is submitted to distillation at 160° C., 1 mm Hg to remove of the low molecular weight products. The distillation residue is the desired PolyHFPO methylester.

The following examples 6 and 7 were made according to the general method C) Introduction of HFPO in one shot (uncontrolled addition) with the details as given in the examples 6 and 7:

Example 6

Catalyst: 1.75 g KF and 15.1 g tetraglyme
Solvent: 191.0 g 1,1,1,3,3-pentafluorobutane
Quantity of HFPO introduced: 200.0 g
Quantity of HFPO polymerized: 190.0 g
PolyHFPO methylester (distillation residue): 175.0 g
Yield: 88%
Equivalent weight for 1 COOCH3 group: 2700 g Example 7

Catalyst: 1.75 g KF and 15.1 g tetraglyme
Solvent: 206.7 g 1,3-bis-(trifluoromethyl)-benzene
Quantity of HFPO introduced: 200.0 g
Quantity of HFPO polymerized: 176.0 g
PolyHFPOmethylester (distillation residue): 164.0 g
Yield: 82%
Equivalent weight for 1 COOCH3 group: 3500 g

The invention claimed is:

1. Process for the oligomerization of hexafluoropropylene oxide (HFPO) in which the sum of the dimers, trimers, tetramers, pentamers and hexamers represents less than 20% of the weight of the polymerized HFPO, the oligomers other than the dimers, trimers, tetramers, pentamers and hexamers having an average molecular weight ranging between 1100 and 4000 g/mol, comprising the steps of contacting hexafluoropropylene oxide at a temperature ranging between −30° C. to +50° C. with a catalytic system formed from potassium fluoride (KF) with a glycol ether in the presence of a solvent, wherein the solvent is a perfluorinated saturated aliphatic or aromatic hydrocarbon with more than 3 and less than 12 C-atoms and optionally a polar group but not comprising chlorine or bromine or partially fluorinated saturated aliphatic or aromatic hydrocarbon with more than 3 and less than 12 C-atoms and optionally a polar group but not comprising chlorine or bromine at a pressure of less than 5 bars by controlled, continuous controlled monomer addition or by adding the hexafluoropropylene oxide in one or two portions, wherein the process is performed in the absence of hexafluoropropylene (HFP).

2. A process according to claim 1, wherein the solvent is not fully fluorinated and the solvent contains an aromatic group, an ether or an ester group.

3. A process according to claim 2, wherein the solvent is selected from the group consisting of nonafluorobutyl-methylether, 1,3-bis-(trifluoromethyl)-benzene and 1,1,1,3,3-pentafluorobutane.

4. A process according to claim 1, wherein the process is carried out at temperatures ranging between −20° C. and +20° C.

5. A process according to claim 1, wherein the process is carried out by continuous controlled monomer addition.

6. A process according to claim 1, wherein the process is carried out with a weight ratio of the di-, tri- or tetraethyleneglycol-dimethylether and the potassium fluoride ranging between 1.0 and 10.0.

7. A process according to claim 2, wherein the process is carried out with a weight ratio of the perfluorinated solvent and the di-, tri- or tetraethyleneglycol-dimethylether ranging between 1 and 25.

8. An oligomerized hexafluoropropylene oxide made in accordance with the process of claim 1.

* * * * *